(12) United States Patent
Li et al.

(10) Patent No.: US 11,444,721 B2
(45) Date of Patent: Sep. 13, 2022

(54) DATA SEGMENTATION METHOD, APPARATUS, AND TERMINAL

(71) Applicant: ZTE CORPORATION, Shenzhen (CN)

(72) Inventors: Jian Li, Shenzhen (CN); Yu Ngok Li, Shenzhen (CN); Jun Xu, Shenzhen (CN); Peng Hao, Shenzhen (CN); Nan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 777 days.

(21) Appl. No.: 16/325,054

(22) PCT Filed: Jan. 18, 2017

(86) PCT No.: PCT/CN2017/071603
§ 371 (c)(1),
(2) Date: Feb. 12, 2019

(87) PCT Pub. No.: WO2018/028154
PCT Pub. Date: Feb. 15, 2018

(65) Prior Publication Data
US 2021/0288748 A1    Sep. 16, 2021

(30) Foreign Application Priority Data

Aug. 12, 2016 (CN) .......................... 201610666758.8

(51) Int. Cl.
*H04L 1/00* (2006.01)
*H04L 69/324* (2022.01)
*H04L 25/08* (2006.01)

(52) U.S. Cl.
CPC .......... *H04L 1/0023* (2013.01); *H04L 1/0003* (2013.01); *H04L 1/0009* (2013.01);
(Continued)

(58) Field of Classification Search
CPC ... H04L 1/0001; H04L 1/0023; H04L 1/0028; H04L 1/0003; H04L 1/0005;
(Continued)

(56) References Cited

U.S. PATENT DOCUMENTS

2002/0013853 A1* 1/2002 Baber ..................... H04L 47/10
709/232
2012/0014347 A1* 1/2012 Tanaka ................ H04W 28/065
370/329
(Continued)

FOREIGN PATENT DOCUMENTS

CN     1716930 A    1/2006
CN     101137196 A    3/2008
(Continued)

OTHER PUBLICATIONS

European Patent Office, EP17838291.7 First Office Action dated Jul. 9, 2021.
(Continued)

*Primary Examiner* — Warner Wong
(74) *Attorney, Agent, or Firm* — Li & Cai Intellectual Property (USA) Office

(57) ABSTRACT

Provided in the present application are a data segmentation method, apparatus, and terminal. The method comprises: a receiving node determines data segmentation indication information corresponding to a first type of data; the receiving node sends the data segmentation indication information to a transmitting node to recommend that the transmitting node use the segmentation method when segmenting the first type of data. The present application solves the problem in the prior art of poor integral link adaptability caused by the interference in some of the resources amongst physical resource blocks.

19 Claims, 8 Drawing Sheets a receiving node determines data segmentation indication information corresponding to first-type data — S701 the receiving node sends the data segmentation indication information to a transmitting node to suggest a segmentation manner used by the transmitting node to segment the first-type data — S702

(52) U.S. Cl.
CPC .......... *H04L 1/0061* (2013.01); *H04L 69/324* (2013.01); *H04L 25/08* (2013.01)

(58) Field of Classification Search
CPC ... H04L 69/322; H04L 69/324; H04L 1/0061; H04L 1/0056; H04L 1/0009; H04L 1/0011; H04L 29/06136; H04L 69/166; H04L 29/04877; H04L 67/108; H04L 1/0035; H04L 25/08
See application file for complete search history.

(56) References Cited

U.S. PATENT DOCUMENTS

| | | | |
|---|---|---|---|
| 2013/0039349 A1 | 2/2013 | Ebrahimi Tazeh Mahalleh et al. | |
| 2013/0148577 A1 | 6/2013 | Terry et al. | |
| 2013/0329661 A1* | 12/2013 | Chen | H04L 1/0026 370/329 |
| 2014/0078959 A1* | 3/2014 | Goransson | H04L 1/0006 370/328 |
| 2015/0038134 A1 | 2/2015 | Cheng | |
| 2015/0215913 A1* | 7/2015 | Cheng | H04W 72/042 370/330 |
| 2015/0271802 A1 | 9/2015 | Kang et al. | |
| 2017/0207880 A1* | 7/2017 | Sun | H04L 5/0055 |
| 2017/0303284 A1* | 10/2017 | Xu | H04L 1/0026 |
| 2019/0123849 A1* | 4/2019 | Baldemair | H04L 1/0023 |

FOREIGN PATENT DOCUMENTS

| | | |
|---|---|---|
| CN | 102088715 A | 6/2011 |
| CN | 103795497 A | 5/2014 |
| CN | 106160987 A | 11/2016 |
| EP | 2106057 A1 | 9/2009 |

OTHER PUBLICATIONS

Anas Showk, et al., "Modeling LTE Protocol for Mobile Terminals Using a Formal Description Technique" issued on Sep. 22, 2009, ICIAP: International Conference on Image Analysis and Processing, 17th Conference, Naples, Italy.
China Patent Office, CN201610666758.8 First Office Action dated Apr. 30, 2021.
English Translation of International Search Report for International Application No. PCT/CN2017/071803 dated May 3, 2017, 2 pages.
European Patent Office, Extended European Search Report dated Jul. 18, 2019 for EP17838291.7.

* cited by examiner

DATA SEGMENTATION METHOD, APPARATUS, AND TERMINAL

CROSS REFERENCE

The present application is based on International Application No. PCT/CN2017/071603, filed on Jan. 18, 2017, which is based upon and claims priority to Chinese Patent Application No. 201610666758.8, filed on Aug. 12, 2016, and the entire contents thereof are incorporated herein by reference.

TECHNICAL FIELD

The present application relates to the field of communications, and in particular, to a data segmentation method, a data segmentation apparatus, and a data segmentation terminal.

BACKGROUND

In mobile communication systems, due to the time-varying characteristics of wireless fading channels, there is significant uncertainty in the communication process. In order to improve the throughput of the system, high-order modulation with a high transmission rate and less redundant error correction codes can be used for communication, so that when the signal-to-noise ratio of the wireless fading channel is ideal, the throughput of the system can be greatly improved, but when the channel is in deep fading, it cannot be ensured to perform communication reliably and stably. In addition, in order to ensure the reliability of communication, low-order modulation with a low transmission rate and large redundant error correction codes can be used for communication, that is, to ensure that the communication is reliably and stably performed when the wireless channel is in deep fading. However, when the signal-to-noise ratio of the channel is relatively high, the transmission rate is rather low, it may limit the improvement of the throughput of the system, and cause waste of resources. In the early development of mobile communication technology, people can only resist against the time-varying characteristics of wireless fading channels, and can only guarantee the communication quality of the system during deep fading of the channel by increasing the transmission power of the transmitter and employing a modulation coding method with low-order and large redundancy, and cannot consider how to improve the throughput of the system. With the advancement of the technology, there has been a technology that can adaptively adjust its transmission power, a modulation and coding scheme and a frame length of data according to the channel state to overcome the time-varying characteristics of the channel, thereby obtaining the best communication effect, which is called self adaptive code modulation technology and belongs to the most typical link adaptation technology.

SUMMARY

The present application provides a data segmentation method, a data segmentation apparatus, and a data segmentation terminal, to at least solve the technical problem in the related art that the interference of some resources between physical resource blocks leads to poor overall link adaptation capability.

According to one aspect of the present disclosure, there is provided a data segmentation method, and the method includes: receiving, by a transmitting node, data segmentation indication information sent by a receiving node, and segmenting, by the transmitting node, first-type data according to the data segmentation indication information and an operation parameter of the transmitting node; and sending, by the transmitting node, second-type data resulted from the segmentation and an actual segmentation manner to the receiving node.

According to one aspect of the present disclosure, there is provided a data segmentation method, and the method includes: receiving, by a transmitting node, data segmentation indication information sent by a receiving node, and segmenting, by the transmitting node, first-type data according to the data segmentation indication information and an operation parameter of the transmitting node; and sending, by the transmitting node, second-type data resulted from the segmentation and an actual segmentation manner to the receiving node.

According to another aspect of the present disclosure, there is provided a data segmentation apparatus, and the apparatus includes: a determining unit configured to determine data segmentation indication information corresponding to first-type data; and a first transmitting unit configured to send the data segmentation indication information to a transmitting node to suggest a segmentation manner used by the transmitting node to segment the first-type data.

According to another aspect of the present disclosure, there is provided a data segmentation apparatus, and the apparatus includes: a receiving unit configured to receive data segmentation indication information sent by a receiving node, and segment first-type data according to the data segmentation indication information and an operation parameter of a transmitting node; and a second transmitting unit configured to send the second-type data resulted from the segmentation and an actual segmentation manner to the receiving node.

According to another aspect of the present disclosure, there is provided a data segmentation terminal, and the terminal includes: a first memory, wherein the first memory is configured to store program codes including steps of: determining data segmentation indication information corresponding to first-type data; and sending the data segmentation indication information to a transmitting node to suggest a segmentation manner used by the transmitting node to segment the first-type data; a first processor connected to the first memory, and configured to process the program codes stored in the first memory; and a first transmitting apparatus connected to the first processor, and configured to transmit the signal obtained by the first processor to a transmitting node.

According to another aspect of the present disclosure, there is provided a data segmentation terminal, and the terminal includes: a second memory, wherein the second memory configured to store program codes including steps of: receiving data segmentation indication information sent by a receiving node, and segmenting first-type data according to the data segmentation indication information and an operation parameter of a transmitting node; and sending second-type data resulted from the segmentation and an actual segmentation manner to the receiving node; a second processor connected to the second memory, and configured to process the program codes saved in the second memory; and a second transmission apparatus connected to the second processor, and configured to transmit the signal obtained by the second processor to the receiving node.

According to another aspect of the present disclosure, there is provided a data storage medium, and the storage medium can be configured to store program codes for performing the following steps: determining data segmentation indication information corresponding to first-type data; and sending the data segmentation indication information to a transmitting node to suggest a segmentation manner used by the transmitting node to segment the first-type data.

According to another aspect of the present disclosure, there is provided a data storage medium, and the storage medium can be configured to store program codes for performing the following steps: receiving data segmentation indication information sent by a receiving node, and segment first-type data according to the data segmentation indication information and an operation parameter of a transmitting node; and sending the second-type data resulted from the segmentation and the actual segmentation manner to the receiving node.

In the present application, the receiving node determines data segmentation indication information corresponding to the first-type data; the receiving node sends the data segmentation indication information to the transmitting node to suggest a segmentation manner used by the transmitting node to segment the first-type data. Therefore, the technical problem that the overall link adaptation capability is poor due to interference of some resources between physical resource blocks in the related art is solved.

BRIEF DESCRIPTION OF THE DRAWINGS

The drawings described herein are intended to provide a further understanding of the present application, and are intended to be a part of this application. The illustrative embodiments of the present application and the description thereof are for explaining the present application and do not constitute an undue limitation of the present application. In the drawings.

DETAILED DESCRIPTION

Figure 1:
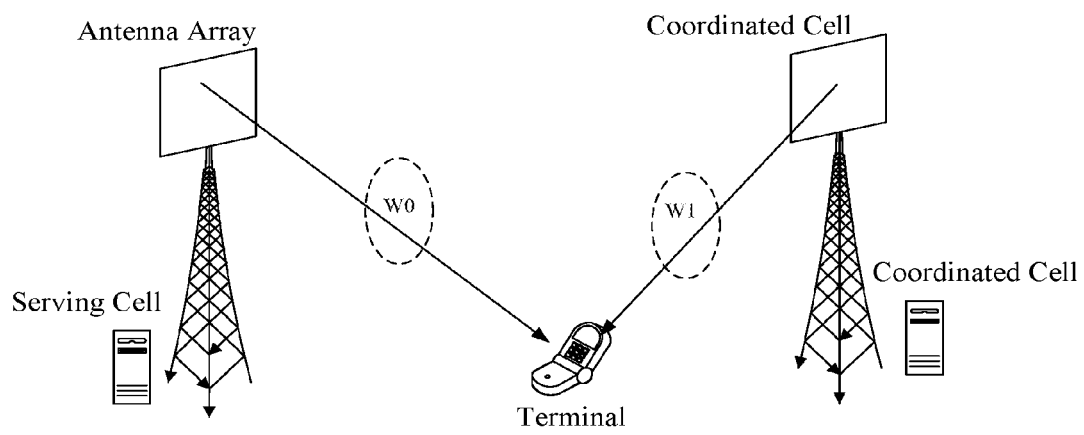
FIG. 1 is a schematic diagram of a base station system in the related art.

The present application will be described in detail below with reference to the drawings in conjunction with the embodiments. It should be noted that the embodiments in the present application and the features in the embodiments may be combined with each other without conflict.

It should be noted that the terms "first", "second" and the like in the specification and claims of the present application and the above-mentioned drawings are used to distinguish similar objects, and are not necessarily used to describe a specific order or sequence.

In a Long Term Evolution (LTE) system, in order to implement the adaptive code modulation technology, the uplink has to transmit control signaling including Channel State Information (CSI). The CSI includes a Channel Quality Indication (CQI), a Pre-coding Matrix Indicator (PMI), and a Rank Indicator (RI). The CSI reflects the state of the downlink physical channel. The base station uses the CSI to perform downlink scheduling and perform data coding and modulation. The CSI feedback may be periodic or non-periodic.

CQI is an indicator used to measure the quality of a downlink channel. In the 36-213 protocol, CQI is represented by an integer value of 0 to 15, which respectively represent different CQI levels, and different CQIs correspond to respective modulation and coding schemes (MCSs), as shown in Table 1. A terminal (UE: User Equipment) should select a CQI level such that in a corresponding MCS the block error rate of the transport block (TB) of the physical downlink shared channel (PDSCH) corresponding to the CQI is not more than 0.1.

TABLE 1

| CQI Index | Modulation Scheme | Code Rate × 1024 | Spectral Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

In the above Table 1, QAM represents Quadrature Amplitude Modulation, and QPSK represents Quadrature Phase Shift Keying, which are digital modulation methods.

After the LTE system has experienced several versions of Rel-8/9/10/11, the R12 technology has come into study. In the Rel-11 standard, the uplink and downlink support up to 64QAM modulation coding. Along with the development of heterogeneous networks, since small cells require higher data transmission rates and higher spectral efficiency of the system, a higher order modulation and coding scheme of 256 QAM is introduced.

In LTE, in addition to the differential CQI, the CQI is represented by 4 bits. The CQI bit is included in the uplink control information (UCI) to be reported. The base station performs scheduling according to the CQI reported by the terminal, and determines a downlink MCS index and resource allocation information. Specifically, the LTE protocol of Rel-8 defines a Modulation and TBS index table (hereinafter also referred to as an MCS Table or MCS table).

As shown in Table 2, the table has 32 levels, basically each level corresponds to one MCS index, and each MCS index essentially corresponds to an MCS (or a spectrum efficiency, the MCS is not limited to the MCS of Table 1). The resource allocation information gives the number of physical resource blocks NPRB that the downlink transmission will occupy. The LTE standard also provides a TBS table according to which the transport block size (TBS) can be obtained given the MCS index and NPRB. With these coded modulation parameters (including MCS, PRB, TBS), the base station can perform coded modulation of downlink data for downlink transmission.

TABLE 2

| CQI Index | Modulation Scheme | Code Rate × 1024 | Spectral Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

After receiving the downlink transmission data, the terminal has to acquire the MCS index of the downlink transmission and the TBS for demodulation and decoding of the data. The base station transmits downlink control information, including a 5-bit MCS index, and a resource allocation location, in a specific downlink control information format (DCI format) through a physical downlink control channel (PDCCH). After acquiring the downlink control information, the terminal obtains the TBS according to the TBS table, and uses the TBS for demodulation and decoding. The DCI format includes the following types: DCI format 0, DCI format 1, DCI format 1A, DCI format 1B, DCI format 1C, DCI format 1D, DCI format 2, DCI format 2A, DCI format 2B, DCI format 2C, DCI format 2D, DCI format 3 and DCI format 3A, etc.

In addition, in digital communication systems, channel coding links (including code block segmentation, codec, rate matching, etc.) are key technologies in the entire digital communication physical layer, which ensures the effectiveness and reliability of the underlying transmission. The data sent from the medium access control (MAC) layer to the physical layer is organized in the form of a transport block (TB), and one TB corresponds to data bits of one MAC PDU (Protocol Data Unit). Usually the length of the transport block is long, generally larger than the maximum length supported by the encoder, so the transport block has to be segmented into several code blocks, and a segmented code block has to be added with a fixed length of cyclic redundancy check (CRC), and then bit-filled for channel coding.

In addition, in the long-term evolution system, due to the use of orthogonal frequency division multiplexing (OFDM) technology, intra-cell interference is generally small, but due to frequency multiplexing between cells, inter-cell interference is rather large, and this has become a major interference issue in an LTE system and leads to poor cell edge performance. In order to improve the performance of the cell edge users and meet the requirements of the cell edge spectrum efficiency, the Coordinated Multi-Point (CoMP) transmission technology is introduced in the Long Term Evolution-Advanced (LTE-A) system. In the CoMP technology, multiple neighboring base stations or nodes are coordinated to provide services for one cell edge user at the same time, to lower the co-channel interference from the neighboring cell received by the cell edge user, and to improve the service quality of the cell edge user. The CoMP technology is mainly divided into three types: Joint Transmission (JT), Dynamic Point Selection/Dynamic Point Blanking (DPS/DPB), and Coordinated Scheduling Coordinated beamforming (CSCB). For the JT, the serving cell and the coordinated cell jointly provide signal transmission to the target user on the same time-frequency resource. For the terminal, the interference signal becomes a useful signal in this case, so that the receiving quality of the signal can be greatly improved.

Figure 2:
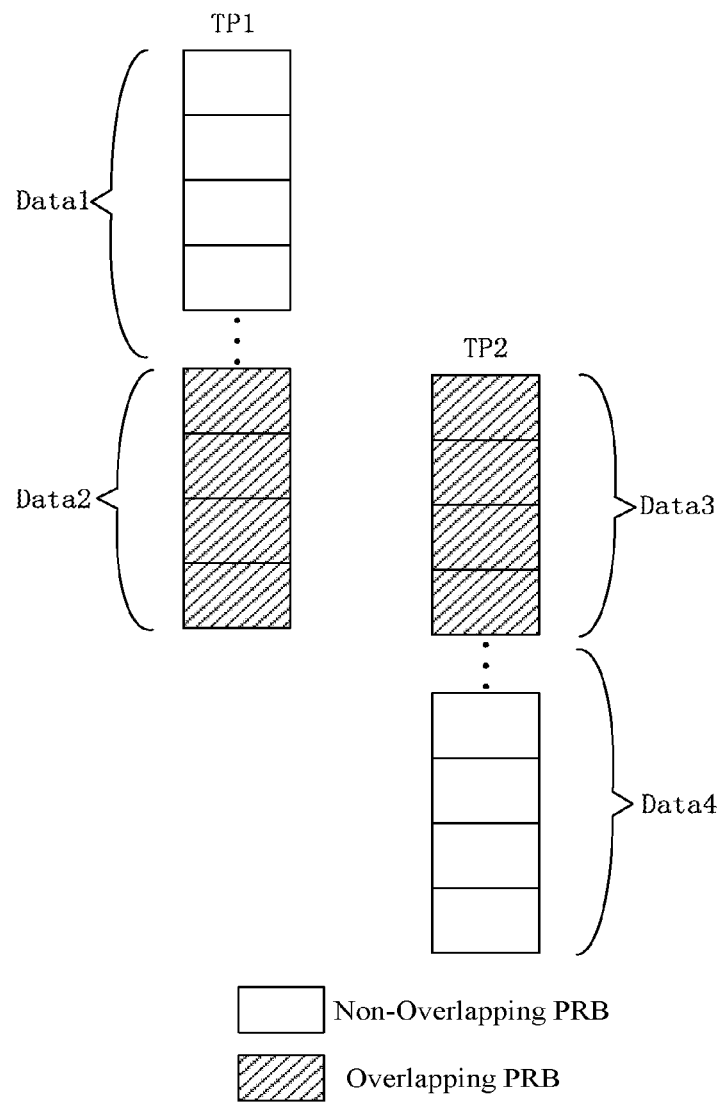
FIG. 2 is a schematic diagram of an optional interference-capable physical resource block in the related art.
Figure 3:
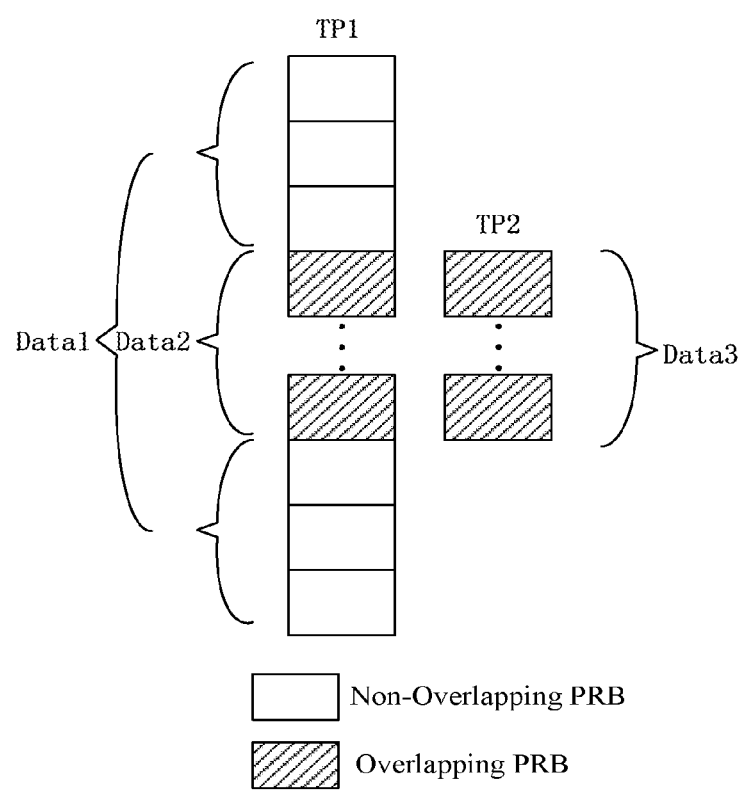
FIG. 3 is a schematic diagram of an optional interference-capable physical resource block in the related art.
Figure 4:
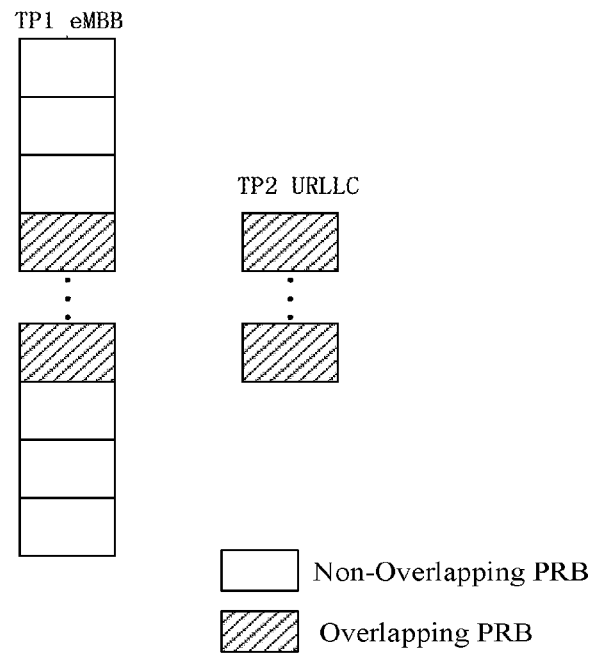
FIG. 4 is a schematic diagram of an optional interference-capable physical resource block in the related art.
Figure 5:
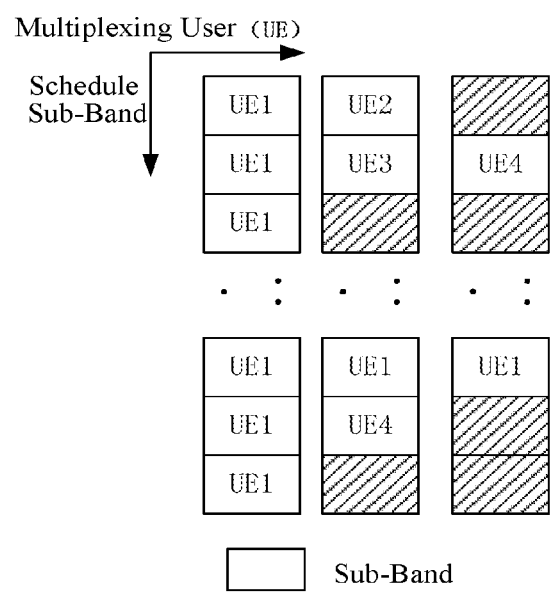
FIG. 5 is a schematic diagram of an optional interference-capable physical resource block in the related art.

The non-correlated TT technology is shown in FIG. 1. There are two base stations jointly serving the user. In this case, the serving cell and the coordinated cell respectively transmit a transport block or a codeword stream to the user, so that there is interference between different transport blocks or codeword streams. In addition, the serving cell and the coordinated cell may separately schedule different transport blocks or codeword streams, which may cause partial overlapping of resource allocation among the coordinated nodes. That is, there is interference on some physical resource blocks, and there is no interference on some physical transport blocks. As shown in FIG. 2 and FIG. 3, the current standard specifies that the same modulation and coding scheme is used on all frequency domain resources occupied by the same transport block, so the above situation will cause link adaptation problems, thereby affecting the overall performance of the system. In addition, for 5G New-RAT, it is necessary to support a variety of service mix, including enhanced mobile broadband (eMBB), ultra-reliability and low-latency communication (URLC), massive Machine Type Communications (mMTC) and the like. The interference situation is quite special in a variety of service mix scenario. As shown in FIG. 4, the same modulation and coding scheme used on all frequency domain resources occupied by the same transport block specified in the current standard may not be applicable to 5G New-RAT. In addition, for MU-MIMO (Multi-user multiple input multiple output), there may be problems of multiplexing different users and numbers on different frequency domain resources, as shown in FIG. 5, the current standard does not support this situation.

In view of the technical problem in the related art that the interference of some resources between physical resource blocks leads to poor overall link adaptation capability, an effective solution has not been proposed yet.

First Embodiment

Figure 6:
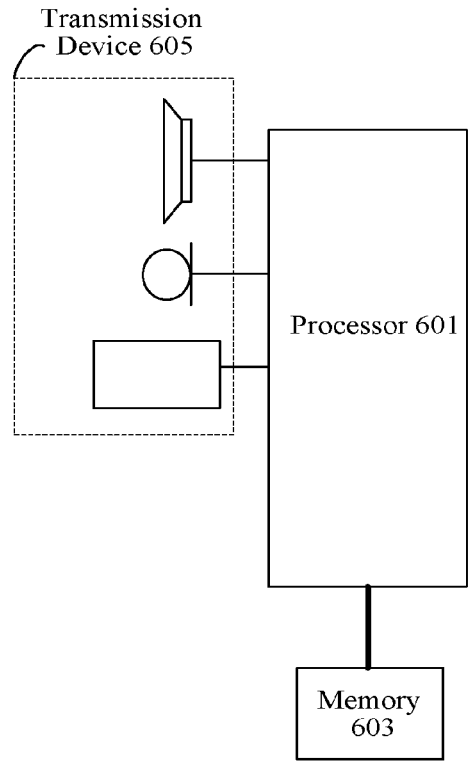
FIG. 6 is a schematic diagram of a computer terminal according to the present application.

The method embodiment provided in the first embodiment of the present application can be executed in a mobile terminal, a computer terminal or other computing apparatus. For example, when running on a computer terminal, as shown in FIG. 6, the computer terminal may include one or more (only one is shown) processor 601 (the processor 601 may include, but is not limited to, a processing device such as a microprocessor MCU or a programmable logic device FPGA), a memory 603 for storing data, and a transmission device 605 for communication function. It will be understood by those skilled in the art that the structure shown in FIG. 6 is merely illustrative and does not limit the structure of the above electronic device.

The memory 603 can be used to store software programs and modules of application software, such as program instructions/modules corresponding to the control method of the device in the present application. The processor 601 executes various function applications and data processing, that is, to implement the above method by running software programs and modules stored in the memory 603. The memory may include high speed random access memory and may also include a non-volatile memory such as one or more magnetic storage devices, a flash memory, or other non-volatile solid state memory. In some examples, the memory may further include a memory remotely located relative to the processor, which can be connected to the computer terminal over a network. Examples of such networks include, but are not limited to, the Internet, an intranet, a local area network, a mobile communication network, and combinations thereof.

The transmission device is for receiving or transmitting data via a network. The above-described network specific examples may include a wireless network provided by a communication provider of a computer terminal. In one example, the transmission device includes a Network Interface Controller (NIC) that can be connected to other network devices through the base station to communicate with the Internet. In one example, the transmission device can be a Radio Frequency (RF) module for communicating with the Internet wirelessly.

According to the present application, a method embodiment of a data segmentation method is provided. It is noted that the steps illustrated in the flowchart of the figures may be performed in a computer system such as a set of computer executable instructions, and, although the logical order is shown in the flowchart, but in some cases the steps shown or described may be performed in a different order than the ones described herein.

Figure 7:
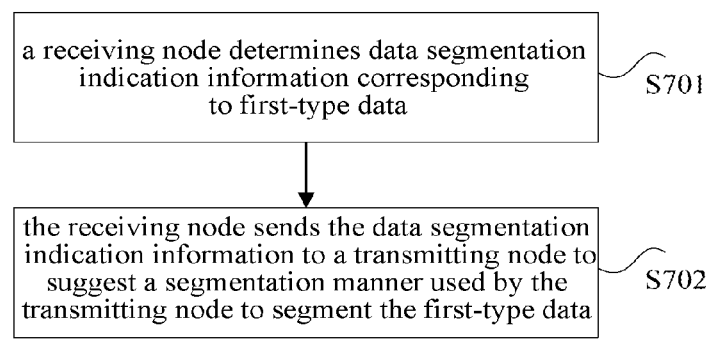
FIG. 7 is a flow chart of a data segmentation method according to the present application.

FIG. 7 is a flowchart of a data segmentation method according to the present application. As shown in FIG. 7, the method includes the following steps.

In Step S701, a receiving node determines data segmentation indication information corresponding to first-type data.

In Step S702, the receiving node sends the data segmentation indication information to a transmitting node to suggest a segmentation manner used by the transmitting node to segment the first-type data.

In the foregoing embodiment, the transmitting node receives the data segmentation indication information sent by the receiving node, and segments the first-type data according to the data segmentation indication information and an operation parameter of the transmitting node. The transmitting node sends the second-type data resulted from the segmentation and the actual segmentation manner to the receiving node. This can solve the technical problem in the related art that the interference of some resources between physical resource blocks leads to poor overall link adaptation capability, and can achieve a technical effect of improving link adaptation capability.

Optionally, the first-type data includes a MAC layer protocol data unit PDU and/or a transport block; and the data segmentation indication information indicates that the first-type data is segmented into one or more second-type data, wherein the second-type data includes at least one of a transport block, a transport block subset, and a code block subset.

Optionally, the transport block subset includes a plurality of transport sub-blocks obtained by segmenting the transport block.

Optionally, the code block subset includes a plurality of code blocks obtained by segmenting the transport block or the transport block subset.

Optionally, the data segmentation indication information further indicates that the transport block subset is segmented into one or more code block subsets.

Optionally, the data segmentation indication information further indicates that the second-type data is segmented into one or more code blocks.

Optionally, when the code length of the second-type data is larger than a preset value, the second-type data is segmented into one or more code blocks, wherein the preset value is 6144 bits.

For example, as shown in FIG. 3, the method of segmenting the second-type data is as follows. The transport block is segmented into two code block subsets, the code block subset 1 corresponds to Data1, and the code block subset 2 corresponds to Data3.

Optionally, the receiving node determining the data segmentation indication information corresponding to the first-type data includes: the receiving node determining the data segmentation indication information based on one or more of channel state information, an interference condition, a load condition, and service characteristics.

For example, as shown in FIG. 3, the interference condition on an overlapping resource is different from that on a non-overlapping resource, and the receiving node suggests a segmentation manner for the transmitting node to segment the transport block. For example, the receiving node suggests segmenting the transport block into two code block subsets; and the code block subsets are further segmented into code blocks.

Optionally, the data segmentation indication information is carried by uplink control information UCI or radio resource control information RRC.

Optionally, the data segmentation indication information indicates at least one of: a number of the second-type data, a data size of the second-type data, a resource occupied by the second-type data, channel state information used by the second-type data, and a modulation and coding scheme corresponding to the second-type data.

The data size of the second-type data can be expressed as:

$$\text{DATA}\_i = N_{RB\_i} * N_{RE\_i} * \text{MOD}_i * \text{CodeRate}_i * N_{SM\_i}$$

Where i denotes the i-th segmented code block, DATA_i denotes the data size of the i-th segmented second-type data, $N_{RB\_i}$ denotes the physical resource block occupied by the i-th segmented second-type data, $N_{RE\_i}$ denotes the number of REs available in the $N_{RB\_i}$ for the i-th segmented second-type data, $\text{MOD}_i$, denotes a modulation order corresponding to the modulation mode used by the i-th segmented second-type data, $\text{CodeRate}_i$ denotes a code rate used by the i-th segmented second-type data, and $N_{SM\_i}$ denotes the number of transport layers used for the i-th segmented second-type data.

Optionally, when the receiving node sends the data segmentation indication information, the sending manner includes at least one of the following: sending the number of the second-type data, the data size of the second-type data, the resource occupied by the second-type data, the channel state information used by the second-type data, and the modulation and coding scheme corresponding to the second-type data in a form of separate feedbacks; sending one or more of the number of the second-type data, the data size of the second-type data, the resource occupied by the second-type data, the channel state information used by the second-type data, and the modulation and coding scheme corresponding to the second-type data after jointly encoding.

Optionally, the resource includes one or more of a frequency domain resource, a time domain resource, a transport layer, a codeword stream, and a beam, where the resource is from the same transmitting node or multiple transmitting nodes.

Optionally, the frequency domain resources include a physical resource block PRB and/or a sub-band.

Optionally, the segmentation manner indicated by the data segmentation indication information includes at least one of the following: an actual number of the segmented data, a size, an occupied resource, a modulation and coding scheme, and a channel used by the segmented data.

Optionally, different second-type data uses different channel quality information and/or uses different modulation and coding schemes.

Optionally, in the case where the second-type data is a code block subset, the second-type data is applied to the same transmitting node; and in the case where the second-type data is composed of a transport block and/or a transport block subset, the second-type data is applied to different transmitting nodes.

Optionally, the transport block may undergo a CRC check process.

Optionally, the first signaling includes uplink control information UCI and/or radio resource control information RRC.

Figure 8:
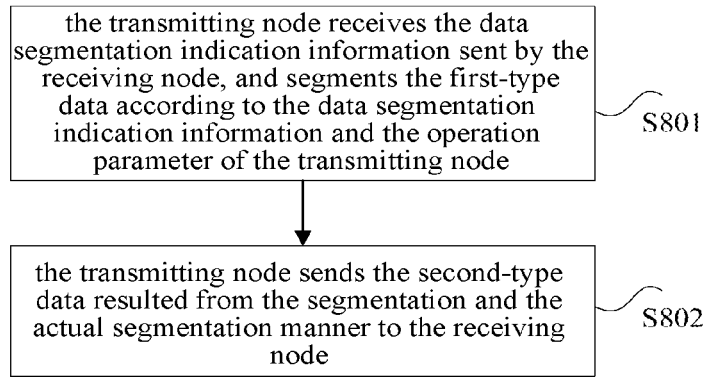
FIG. 8 is a flow chart of another data segmentation method according to the present application.

According to another aspect of the present application, there is also provided another data segmentation method. The transmitting node may also indicate the manner in which the receiving node segments the data. As shown in FIG. 8, the method includes the following steps.

In Step S801, the transmitting node receives the data segmentation indication information sent by the receiving node, and segments the first-type data according to the data segmentation indication information and the operation parameter of the transmitting node.

In Step S802, the transmitting node sends the second-type data resulted from the segmentation and the actual segmentation manner to the receiving node.

Optionally, the first-type data includes a MAC layer protocol data unit PDU and/or a transport block; and the second-type data includes at least one of a transport block, a transport block subset, and a code block subset.

Optionally, the transport block subset includes a plurality of transport sub-blocks obtained by segmenting the transport block.

Optionally, the code block subset includes a plurality of code blocks obtained by segmenting the transport block or the transport block subset.

Optionally, the data segmentation indication information indicates that the transport block subset is segmented into one or more code block subsets.

Optionally, the data segmentation indication information indicates that the second-type data is segmented into one or more code blocks.

Optionally, the actual segmentation manner is carried in the downlink control information DCI or the radio resource control information RRC.

Optionally, the operation parameter of the transmitting node includes one or more of channel state information, interference information, load information, scheduling information, and service characteristics.

Optionally, the data segmentation indication information indicates at least one of: a number of the second-type data, a data size of the second-type data, a resource occupied by the second-type data, channel state information used by the second-type data, and a modulation and coding scheme corresponding to the second-type data.

Optionally, when the transmitting node sends the DCI signaling or the RRC signaling, the sending manner includes at least one of the following: sending the number of the second-type data, the data size of the second-type data, the resource occupied by the second-type data, the channel state information used by the second-type data, and the modulation and coding scheme corresponding to the second-type data after separately encoding; sending the number of the second-type data, the data size of the second-type data, the resource occupied by the second-type data, the channel state information used by the second-type data, and the modulation and coding scheme corresponding to the second-type data after jointly encoding.

Optionally, the resource includes one or more of a frequency domain resource, a time domain resource, a transport layer, a codeword stream, and a beam, where the resource is from the same transmitting node or multiple transmitting nodes.

Optionally, the frequency domain resources include a physical resource block PRB and/or a sub-band.

Optionally, the segmentation manner includes at least one of: segmenting according to the number of the second-type data, segmenting according to the data size of the second-type data, and segmenting according to the resources occupied by the second-type data.

Optionally, different second-type data uses different channel quality information and/or uses different modulation and coding schemes.

Optionally, in the case where the second-type data is a code block subset, the second-type data is applied to the same receiving node; and in the case where the second-type data is composed of a transport block and/or a transport block subset, the second-type data is applied to different receiving nodes.

Optionally, the transport block can undergo a CRC check process.

Optionally, when the code length of the second-type data is larger than a preset value, the second-type data is segmented into one or more code blocks, wherein the preset value is 6144 bits.

Optionally, the second signaling includes downlink control information DCI and/or radio resource control information RRC.

Embodiments of the present application are described in detail below with reference to FIGS. 9 through 11.

Figure 9:
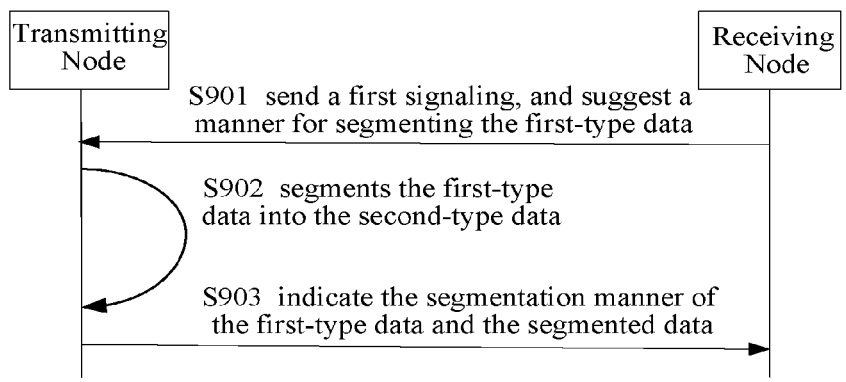
FIG. 9 is a flow chart of an optional data segmentation method according to the present application.

The transmitting node may be one, as shown in FIG. 9.

In S901, the receiving node UE sends a first signaling to the transmitting node, and suggests a manner for segmenting the first-type data.

The receiving node UE may suggest a manner in which the transmitting node segments the first-type data based on the channel state information, the interference situation, the load condition, and the service characteristics. For example, for the situation shown in FIG. 3, when the interference condition on an overlapping resource is different from that on a non-overlapping resource, the receiving node may suggest a manner in which the transmitting node segments the transport block. For example, the transmitting node segmenting the transport block into two code block subsets; and further segmenting the code block subset into code blocks.

In S902, the transmitting node acquires the first signaling, and segments the first-type data into the second-type data according to the actual scheduling situation, the load situation, and the buffering situation.

For example, as shown in FIG. 3, the method of segmenting the second-type data is as follows. The transport block is segmented into two code block subsets, the code block subset 1 corresponds to Data1, and the code block subset 2 corresponds to Data2.

Whether the second-type data can be further segmented into one or more code blocks depends on the maximum code length Z. For example, when the size of the code block subset is larger than 6144, and the code block subset is further segmented into multiple code blocks. The number of code blocks segmented from the block subset is determined by the following equation, Num=ceil (the size of the code block subset/6144).

In S903, the transmitting node sends a data signal (segmented data) and a second signaling to the receiving node, where the second signaling indicates the segmentation manner of the first-type data.

Optionally, the embodiment shown in FIG. 9 is applicable to the case where there are two types of services (such as eMBB and URLLC) in the network as shown in FIG. 4, the transmitting node sends the URLLC service in the vicinity, and the occupied bandwidth is small. In this case, the interference condition on the overlapping resource is different from that on the non-overlapping resource. The receiving node suggests the manner in which the transmitting node segments the transport block, for example, suggests the transmitting node segmenting the transport block into two code block subsets; and further segmenting the code block subset into code blocks.

In addition, when the second-type data is segmented, the transport block may be segmented into two code block subsets. The transmitting node has to determine at least one of the following: the number of the second-type data, the data size of the second-type data, the resource occupied by the second-type data, the channel state information used by the second-type data, and the modulation and coding scheme corresponding to the second-type data are then segmented.

Optionally, the embodiment shown in FIG. 9 is also applicable to the case shown in FIG. 5, that is, users multiplexing on different sub-bands are different, and the number of users multiplexing at the same time is also different, since multiplexing users cannot be completely orthogonal, so interference exists. This indicates that interferences received on different sub-bands are different. The receiving node suggests the segmenting manner in which the transmitting node segments the transport block, for example, suggest the transmitting node segmenting the transport block into three code block subsets, and further segmenting the code block subsets into code blocks.

In addition, when the second-type data is segmented, the transport block can be segmented into three code block subsets.

Optionally, the receiving node determining the data segmentation indication information corresponding to the first-type data includes: the receiving node determining the data segmentation indication information based on one or more of channel state information, an interference condition, a load condition, service characteristics and the capability of the receiving node.

Optionally, the sending manner of the capability of the receiving node includes: being carried in the radio resource control information RRC for transmission, and reported by the receiving node to the core network.

If the data segmentation indication information determined by the receiving node based on one or more of channel state information, an interference condition, a load condition, and service characteristics indicates a value X, and the data segmentation indication information determined by the receiving node based on the capability of the receiving node indicates a value N, the actually used data segmentation indication information indicates min(X, N), where min(X, N) is a function for taking the minimum value of the value X and the value N, and N is a fixed configuration for a specific user. The above X and N can be directly carried in the corresponding message, or can be determined by an instruction.

The transmitting node may be one. The embodiment of the present application is described in detail below with reference to FIG. 9.

In S901, the receiving node UE sends the first signaling to the transmitting node, and suggests a manner for segmenting the first-type data.

The receiving node UE may suggest a manner for segmenting the first-type data based on channel state information, an interference condition, a load condition, service characteristics and UE capability. For example, for the situation as shown in FIG. 3, the interference condition on an overlapping resource is different from that on a non-overlapping resource, and the receiving node may suggest a manner in which the transmitting node segments the transport block, for example, based on the interference condition, suggest the transmitting node segmenting the MAC layer protocol data unit PDU into three transport blocks/codeword streams, that is, X=3, and since the UE capability only can transmit 2 code words, i.e. N=2, then the actual suggested value is min[X,N]=2 codeword streams.

In S902, the transmitting node acquires the first signaling, and segments the first-type data into the second-type data according to the actual scheduling situation, the load situation, and the buffering situation.

For example, as shown in FIG. 3, the method for segmenting the second-type data is as follows. The MAC layer protocol data unit PDU is segmented into two transport blocks/codeword streams, and the transport block/codeword stream 1 corresponds to Data1, and the transport block/code Word stream 2 corresponds to Data2, respectively.

Whether the second-type data can be further segmented into one or more code blocks depends on the maximum code length Z. For example, the transport block size is larger than 6144, the transport block is further segmented into multiple code blocks, and the number of the code blocks segmented from the transport block may be determined by the following equation, Num=ceil (transport block size/6144).

In S903, the transmitting node sends the data signal and the second signaling to the receiving node, where the second signaling indicates a manner for segmenting the first-type data.

Optionally, the embodiment shown in FIG. 9 is applicable to the case where there are two types of services (such as eMBB and URLLC) in the network as shown in FIG. 4, the transmitting node sends the URLLC service in the vicinity, and the occupied bandwidth is small. In this case, the interference condition on the overlapping resource is different from that on the non-overlapping resource. The receiving node suggests the manner in which the transmitting node segments the transport block, for example, suggests the transmitting node segmenting the MAC layer protocol data unit PDU into two transport blocks/codeword streams, and further segmenting the transport blocks/codeword streams into code blocks.

In addition, when the second-type data is segmented, the MAC layer protocol data unit PDU may be segmented into two transport blocks/codeword streams; the transmitting node has to determine at least one of the following: a number of the second-type data, a data size of the second-type data, a resource occupied by the second-type data, channel state information used by the second-type data, and a modulation and coding scheme corresponding to the second-type data, before the transmitting node performs the segmentation.

Figure 10:
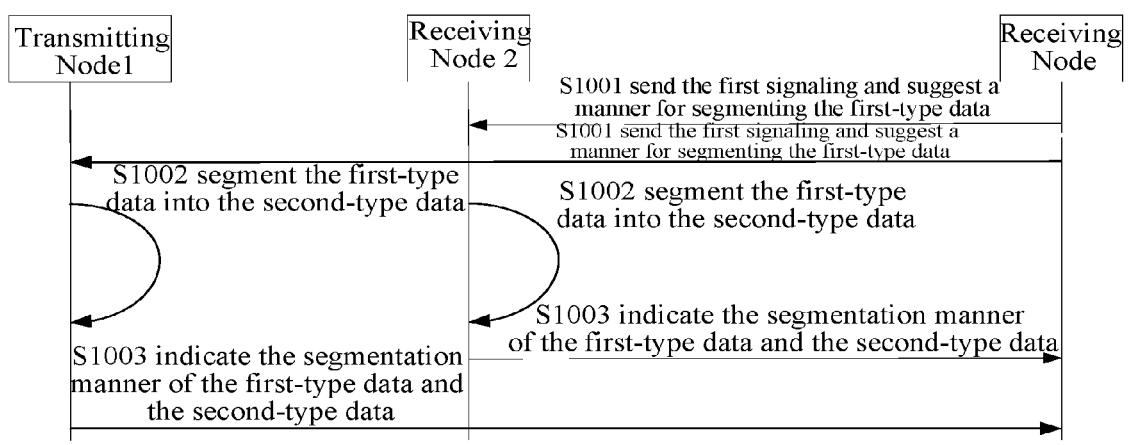
FIG. 10 is a flow chart of an optional data segmentation method according to the present application.

When there are transmitting nodes (i.e., primary and secondary base stations), an embodiment as shown in FIG. 10 may apply, as shown in FIG. 10.

In S1001, the receiving node sends the first signaling to the transmitting node 1 and the transmitting node 2, and suggests a manner for segmenting the first-type data.

The receiving node may suggest a manner in which the transmitting node segments the first-type data based on the channel state information, the interference situation, the load condition, and the service characteristics.

For example, as shown in FIG. 2, the interference condition on the overlapping resource is different from that on the non-overlapping resource. The receiving node suggests a manner in which the transmitting node segments the MAC PDU, for example, suggests that the transmitting node segmenting the MAC PDU into two transport blocks, which are respectively for transmission through 2 TPs. For example, TP1 (corresponding to the transmitting node 1) transmits the transport block 1, and TP2 (corresponding to the transmitting node 2) transmits the transport block 2, the transport block is further segmented into code block subsets for different interference conditions. The code block subsets is further segmented into code blocks.

In S1002, the transmitting node acquires the first signaling, and segments the first-type data into the second-type data according to the actual scheduling situation, the load situation, and the buffering situation.

For example, as shown in FIG. 2, the method of segmenting the second-type data is as follows: segmenting the MAC PDU into two transport blocks, with the transport block 1 corresponding to Data1 and Data2, the transport block 2 corresponding to Data3 and Data4; further segmenting the transport block 1 into 2 code block subsets, with the code block subset 1 corresponding to Data1, code block subset 2 corresponding to Data2; further segmenting the transport block 2 into 2 code block subsets, with the code block subset 1 corresponding to Data3, and the code block subset 2 corresponding to Data4. If the code block subset size is less than 6144, then all of the Data1 to Data4 correspond to the code blocks.

In S1003, the transmitting node sends the data signal (the second-type data resulted from the segmentation) and the second signaling to the receiving node, where the second signaling indicates a manner for segmenting the first-type data.

Figure 11:
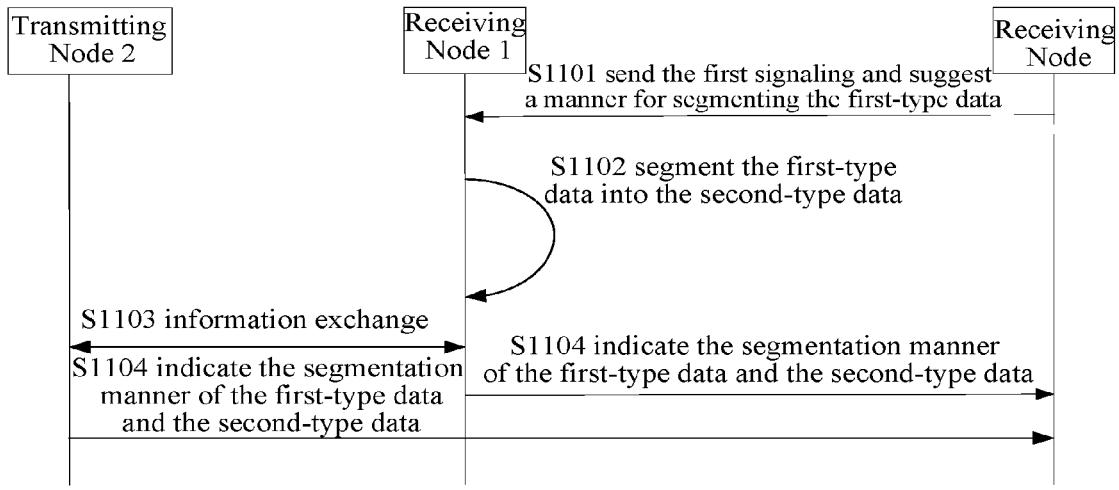
FIG. 11 is a flow chart of an optional data segmentation method according to the present application.

Optionally, the transmitting nodes can exchange signaling through information exchange, as shown in FIG. 11.

In S1101, the receiving node sends the first signaling to the transmitting node 1, and suggests a manner for segmenting the first-type data.

The receiving node may suggest a manner for segmenting the first-type data based on channel state information, an interference condition, a load condition, and service characteristics.

For example, as shown in FIG. 3, the interference condition on the overlapping resource is different from that on the non-overlapping resource. The receiving node suggests a manner in which the transmitting node segments the transport block, for example, suggests the transmitting node segmenting the transport block into two transport block subsets, which are respectively for transmission through 2 TPs. For example, TP1 transmits the transport block 1, and TP2 transmits the transport block subset 2. The transmission subset is further segmented into code block subsets for different interference scenarios. The code block subsets are further segmented into code blocks.

In S1102, the transmitting node acquires the first signaling, and segments the first-type data into the second-type data according to the actual scheduling situation, the load situation, and the buffering situation.

In S1103, the transmitting node 1 and the transmitting node 2 perform information interaction, for example, the transmitting node 2 acquires related information (such as first signaling) sent by the receiving node to the transmitting node 1, and the like before the transmitting nodes perform data segmentation.

For example, as shown in FIG. 2, the method of segmenting the second-type data is as follows: segmenting the transport block into two transport block subsets, with the transport block subset 1 corresponding to Data1 and Data2, the transport block subset 2 corresponding to Data3; further segmenting the transport block 1 into 2 code block subsets, with the code block subset 1 corresponding to Data1, the code block subset 2 corresponding to Data2; and further segmenting the transport block subset 2 into 1 code block subset corresponding to Data3. If each of the code block subset sizes is less than 6144, then all of the Data1 to Data3 correspond to the code blocks.

In S1104, the transmitting node sends the data signal (the second type data) and the second signaling to the receiving node, where the second signaling indicates a manner for segmenting the first-type data.

Figure 12:
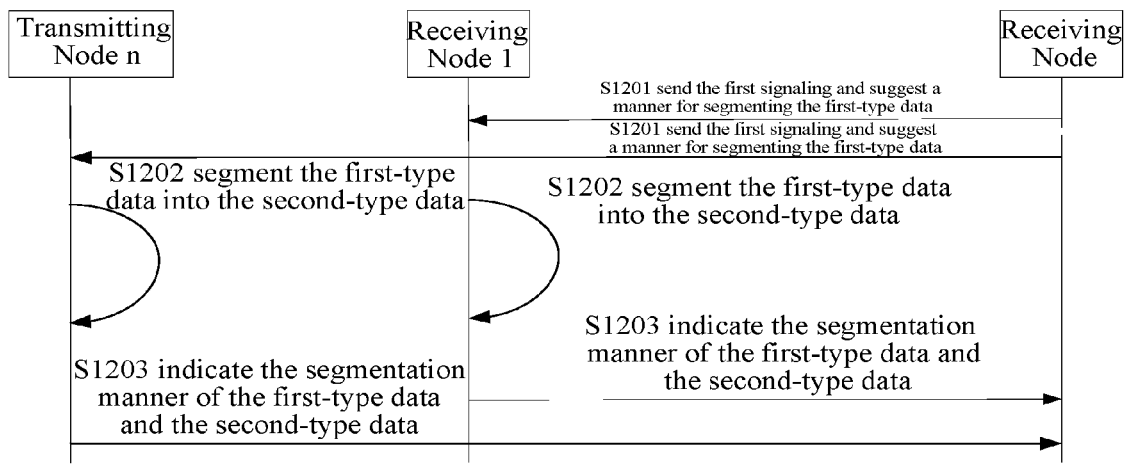
FIG. 12 is a flow chart of an optional data segmentation method according to the present application.

In the case where there are multiple transmitting nodes, data segmentation can be performed according to the steps shown in FIG. 12.

In S1201, the receiving node sends the first signaling to the transmitting node 1 to the transmitting node n, and suggests a manner for segmenting the first-type data, where n>1.

The receiving node may suggest a manner in which the transmitting node segments the first-type data based on the channel state information, the interference situation, the load condition, and the service characteristics.

For example, as shown in FIG. 3, the interference condition on the overlapping resource is different from that on the non-overlapping resource. The receiving node suggests that the transmitting node segments the transport block, for example, suggests the transmitting node segmenting the transport block into two transport block subsets, which are respectively for transmission through 2 TPs. For example, TP1 transmits the transport block 1, and TP2 transmits the transport block subset 2. The transport block subset are further segmented into code blocks subsets for different interference scenarios. The code block subsets are further segmented into code blocks.

In S1202, the transmitting node acquires the first signaling, and segments the first-type data into the second-type data according to the actual scheduling situation and/or the load situation and/or the buffering situation.

For example, as shown in FIG. 3, the method of segmenting the second-type data is as follows: segmenting the transport block into two transport block subsets, with the transport block subset 1 corresponding to Data1 and Data2, the transport block subset 2 corresponding to Data3; further segmenting the transport block 1 into 2 code block subsets, with the code block subset 1 corresponding to Data1, the code block subset 2 corresponding to Data2; and further segmenting the transport block 2 into 1 code block subset corresponding to Data3. If each of the code block subset sizes is less than 6144, then all of the Data1 to Data3 correspond to the code blocks.

In S1203, The transmitting node sends the data signal (the second type data) and the second signaling to the receiving node, where the second signaling indicates a manner for segmenting the first-type data.

It should be noted that, in this embodiment, there may be multiple transmitting nodes, and the user equipment UE may send signaling one by one and receive the segmentation manner fed back by the transmitting node base stations one by one.

Through the description of the above embodiments, those skilled in the art can clearly understand that the method according to the above embodiment can be implemented by means of software in combination with a necessary general hardware platform, and of course, by hardware, but in many cases, the former is a better implementation. Based on such understanding, the technical solution of the present application, which is essential or contributes to the prior art, may be embodied in the form of a software product stored in a storage medium (such as a ROM/RAM, a magnetic disk, an optical disk), and includes a plurality of instructions for causing a terminal device (which may be a mobile phone, a computer, a server, or a network device, etc.) to perform the method according to the embodiments of the present application.

Second Embodiment

A data segmentation apparatus is also provided in the present application. The apparatus is used to implement the above embodiments and preferred implementations, and the description that has been made will not be repeated. As used below, the term "module" may implement a combination of software and/or hardware of a predetermined function. Although the apparatuses described in the following embodiments are preferably implemented in software, hardware or a combination of software and hardware is also possible and contemplated.

Figure 13:
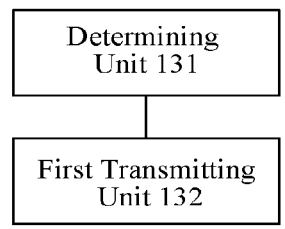
FIG. 13 is a block diagram of a data segmentation apparatus according to the present application.

FIG. 13 is a block diagram of a data segmentation apparatus according to the present application. As shown in FIG. 13, the apparatus may include: a determining unit 131 and a first transmitting unit 132.

The determining unit 131 is configured to determine data segmentation indication information corresponding to first-type data.

The first transmitting unit 132 is configured to send the data segmentation indication information to a transmitting node to suggest a segmentation manner used by the transmitting node to segment the first-type data.

In the foregoing embodiment, the determining unit determines data segmentation indication information corresponding to first-type data; and the first transmitting unit sends the data segmentation indication information to a transmitting node to suggest a segmentation manner used by the transmitting node to segment the first-type data. This can solve the technical problem in the related art that the interference of some resources between physical resource blocks leads to poor overall link adaptation capability, and can achieve a technical effect of improving link adaptation capability.

Optionally, the first-type data includes a MAC layer protocol data unit PDU and/or a transport block; and the data segmentation indication information indicates that the first-type data is segmented into one or more second-type data, wherein the second-type data includes at least one of a transport block, a transport block subset, and a code block subset.

Optionally, the transport block subset includes a plurality of transport sub-blocks obtained by segmenting the transport block.

Optionally, the code block subset includes a plurality of code blocks obtained by segmenting the transport block or the transport block subset.

Optionally, the data segmentation indication information further indicates that the transport block subset is segmented into one or more code block subsets.

Optionally, the data segmentation indication information further indicates that the second-type data is segmented into one or more code blocks.

Optionally, the determining unit is further configured to determine data segmentation indication information based on one or more of channel state information, an interference condition, a load condition, and service characteristics.

Optionally, the data segmentation indication information is carried by uplink control information UCI or radio resource control information RRC.

Optionally, the data segmentation indication information indicates at least one of: a number of the second-type data, a data size of the second-type data, a resource occupied by the second-type data, channel state information used by the second-type data, and a modulation and coding scheme corresponding to the second-type data.

Optionally, the first transmitting unit includes: a first transmitting module configured to send the number of the second-type data, the data size of the second-type data, the resource occupied by the second-type data, the channel state information used by the second-type data, and the modulation and coding scheme corresponding to the second-type data in a form of separate feedbacks; and a second transmitting module configured to send one or more of the number of the second-type data, the data size of the second-type data, the resource occupied by the second-type data, the channel state information used by the second-type data, and the modulation and coding scheme corresponding to the second-type data after jointly encoding.

Optionally, the resource includes one or more of a frequency domain resource, a time domain resource, a transport layer, a codeword stream, and a beam, where the resource is from the same transmitting node or multiple transmitting nodes.

Optionally, the frequency domain resources include a physical resource block PRB and/or a sub-band.

Optionally, the segmentation manner indicated by the data segmentation indication information includes at least one of the following: an actual number of the segmented data, a size, an occupied resource, a modulation and coding scheme, and a channel used by the segmented data.

Optionally, different second-type data uses different channel quality information and/or uses different modulation and coding schemes.

Optionally, in the case where the second-type data is a code block subset, the second-type data is applied to the same transmitting node; and in the case where the second-type data is composed of a transport block and/or a transport block subset, the second-type data is applied to different transmitting nodes.

Optionally, the transport block may undergo a CRC check process.

Optionally, the first transmitting unit is further configured to: when the code length of the second-type data is larger than a preset value, instruct to segment the second-type data into one or more code blocks, wherein the preset value is 6054 bits.

Figure 14:
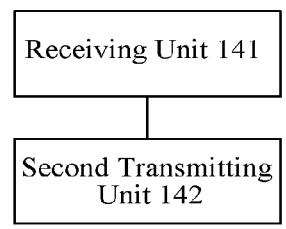
FIG. 14 is a block diagram of another data segmentation apparatus according to the present application.

According to another aspect of the present application, as shown in FIG. 14, a data segmentation apparatus is further provided, and the apparatus includes a receiving unit 141 and a second transmitting unit 142.

The receiving unit 141 is configured to receive data segmentation indication information sent by a receiving node, and segment first-type data according to the data segmentation indication information and an operation parameter of a transmitting node.

The second transmitting unit 142 is configured to send the second-type data resulted from the segmentation and the actual segmentation manner to the receiving node.

Optionally, the first-type data includes a MAC layer protocol data unit PDU and/or a transport block; and the second-type data includes at least one of a transport block, a transport block subset, and a code block subset.

Optionally, the transport block subset includes a plurality of transport sub-blocks obtained by segmenting the transport block.

Optionally, the code block subset includes a plurality of code blocks obtained by segmenting the transport block or the transport block subset.

Optionally, the segmentation manner further indicates that the transport block subset is segmented into one or more code block subsets.

Optionally, the data segmentation indication information indicates that the second-type data is segmented into one or more code blocks.

Optionally, the actual segmentation manner is carried in downlink control information DCI or radio resource control information RRC.

Optionally, the operation parameter of the transmitting node includes one or more of channel state information, interference information, load information, scheduling information, and service characteristics.

Optionally, the data segmentation indication information indicates at least one of: a number of the second-type data, a data size of the second-type data, a resource occupied by the second-type data, channel state information used by the second-type data, and a modulation and coding scheme corresponding to the second-type data.

Optionally, the second transmitting unit includes: a second transmitting module configured to send the number of the second-type data, the data size of the second-type data, the resource occupied by the second-type data, the channel state information used by the second-type data, and the modulation and coding scheme corresponding to the second-type data after separately encoding; and send one or more of the number of the second-type data, the data size of the second-type data, the resource occupied by the second-type data, the channel state information used by the second-type data, and the modulation and coding scheme corresponding to the second-type data after jointly encoding.

Optionally, the resource includes one or more of a frequency domain resource, a time domain resource, a transport layer, a codeword stream, and a beam, where the resource is from the same transmitting node or multiple transmitting nodes.

Optionally, the frequency domain resources include a physical resource block PRB and/or a sub-band.

Optionally, the segmentation manner indicated by the data segmentation indication information includes at least one of: segmenting according to the number of the second-type data, segmenting according to the data size of the second-type data, and segmenting according to the resources occupied by the second-type data.

Optionally, different second-type data uses different channel quality information and/or uses different modulation and coding schemes.

Optionally, in the case where the second-type data is a code block subset, the second-type data is applied to the same receiving node; and in the case where the second-type data is composed of a transport block and/or a transport block subset, the second-type data is applied to different receiving nodes.

Optionally, the transport block may undergo a CRC check process.

Optionally, the segmentation further indicates that when the code length of the second-type data is larger than a preset value, segment the second-type data into one or more code blocks, wherein the preset value is 6054 bits.

According to an aspect of the present application, a data segmentation terminal is provided, and the terminal includes: a first memory, wherein the first memory is configured to store program codes including: determining data segmentation indication information corresponding to first-type data; and sending the data segmentation indication information to a transmitting node to suggest a segmentation manner used by the transmitting node to segment the first-type data; a first processor connected to the first memory, and configured to process the program codes stored in the first memory; and a first transmitting apparatus connected to the first processor, and configured to transmit the signal obtained by the first processor to a transmitting node.

According to another aspect of the present application, there is also provided a data segmentation terminal, and the terminal includes: a second memory, wherein the second memory is configured to store program codes including: receiving data segmentation indication information sent by a receiving node, and segmenting first-type data according to the data segmentation indication information and an operation parameter of a transmitting node; and sending the second-type data resulted from the segmentation and the actual segmentation manner to the receiving node; a second processor connected to the second memory, and configured to process the program codes saved in the second memory; and a second transmitting apparatus connected to the second processor, and configured to transmit the signal obtained by the second processor to a receiving node.

It should be noted that each of the above modules may be implemented by software or hardware. For the latter, the implementation may be, but not limited to, the modules are all disposed in the same processor; or, the modules are disposed in different processors in any combination.

Third Embodiment

An embodiment of the present application also provides a storage medium.

Optionally, in the embodiment, the storage medium may be configured to store program codes for performing the following steps.

In S1, data segmentation indication information corresponding to first-type data is determined.

In S2, the data segmentation indication information is sent to a transmitting node to suggest a segmentation manner used by the transmitting node to segment the first-type data.

Optionally, the storage medium is further arranged to store program codes for performing the following steps.

In S3, data segmentation indication information sent by a receiving node is received, and first-type data is segmented according to the data segmentation indication information and an operation parameter of a transmitting node.

In S4, the second-type data resulted from the segmentation and the actual segmentation manner are sent to the receiving node.

Optionally, in this embodiment, the storage medium may include, but not limited to various media that can store program codes, such as a USB flash drive, a Read-Only Memory (ROM), a Random Access Memory (RAM), a mobile hard disk, and a magnetic disk or an optical disk.

Optionally, in this embodiment, the processor performs according to the stored program codes in the storage medium: determining data segmentation indication information corresponding to first-type data; and sending the data segmentation indication information to a transmitting node to suggest a segmentation manner used by the transmitting node to segment the first-type data.

Optionally, in this embodiment, the processor performs according to the stored program codes in the storage medium: receiving data segmentation indication information sent by a receiving node, and segment first-type data according to the data segmentation indication information and an operation parameter of a transmitting node; and sending the second-type data resulted from the segmentation and the actual segmentation manner to the receiving node.

For example, the specific examples in this embodiment may refer to the examples described in the foregoing embodiments and the optional implements, and details are not described herein again.

It will be apparent to those skilled in the art that the various modules or steps of the present disclosure described above can be implemented by a general-purpose computing device, which can be centralized on a single computing device or distributed across a network of multiple computing devices. Alternatively, they may be implemented by program codes executable by a computing device such that they may be stored in a storage device and executed by the computing device and, in some cases, may perform the steps shown or described in an order different from the order herein. Alternatively, they may be fabricated separately into individual integrated circuit modules, or a plurality of modules or steps thereof may be fabricated as a single integrated circuit module. Thus, the present disclosure is not limited to any specific combination of hardware and software.

The above description is only the preferred embodiments of the present disclosure, and is not intended to limit the present disclosure, and various modifications and changes can be made to the present disclosure. Any modifications, equivalent substitutions, improvements, etc., made within the spirit and scope of the present disclosure are intended to be included within the scope of the present disclosure.

The invention claimed is:

1. A data segmentation method, comprising:
   determining, by a receiving node, data segmentation indication information corresponding to first-type data; and
   sending, by the receiving node, the data segmentation indication information to a transmitting node to suggest a segmentation manner used by the transmitting node to segment the first-type data,
   wherein the data segmentation indication information comprises at least one of: a number of the second-type data, a data size of the second-type data, a resource occupied by the second-type data, channel state information used by the second-type data, and a modulation and coding scheme corresponding to the second-type data, and
   wherein determining by the receiving node data segmentation indication information corresponding to first-type data comprising:
   determining, by the receiving node, the data segmentation indication information based on one or more of channel state information, an interference condition, a load condition, and service characteristics indicates a value X, and the data segmentation indication information determined by the receiving node based on the capability of the receiving node indicates a value N, the data segmentation indication information actually used indicates min(X, N), where min(X, N) is a function for taking the minimum value of the value X and the value N, and N is a fixed configuration for a specific user.

2. The method according to claim 1, wherein the first-type data comprises a MAC layer protocol data unit PDU and/or a transport block; and the data segmentation indication information indicates that the first-type data is segmented into one or more second-type data, and the second-type data comprises at least one of a transport block, a transport block subset, and a code block subset.

3. The method according to claim 2, wherein the transport block subset comprises a plurality of transport sub-blocks obtained by segmenting the transport block.

4. The method according to claim 2, wherein the code block subset comprises a plurality of code blocks obtained by segmenting the transport block or the transport block subset.

5. The method according to claim 2, wherein the data segmentation indication information further indicates that the transport block subset is segmented into one or more code block subsets.

6. The method according to claim 2, wherein the data segmentation indication information further indicates that the second-type data is segmented into one or more code blocks.

7. The method according to claim 2, wherein the data segmentation indication information indicates at least one of: a number of the second-type data, a data size of the second-type data, a resource occupied by the second-type data, channel state information used by the second-type data, and a modulation and coding scheme corresponding to the second-type data;
   wherein the resource comprises one or more of a frequency domain resource, a time domain resource, a transport layer, a codeword stream, and a beam, where the resource is from the same transmitting node or multiple transmitting nodes; and
   wherein the frequency domain resources comprise a physical resource block PRB and/or a sub-band.

8. The method according to claim 7, wherein when the receiving node sends the data segmentation indication information, the sending manner comprises at least one of:
   sending the number of the second-type data, the data size of the second-type data, the resource occupied by the second-type data, the channel state information used by the second-type data, and the modulation and coding scheme corresponding to the second-type data in a form of separate feedbacks; and
   sending one or more of the number of the second-type data, the data size of the second-type data, the resource occupied by the second-type data, the channel state information used by the second-type data, and the modulation and coding scheme corresponding to the second-type data after jointly encoding; and wherein determining by the receiving node the data segmentation indication information corresponding to the first-type data, comprises:
determining, by the receiving node, the data segmentation indication information based on one or more of channel state information, an interference condition, a load condition, service characteristics and the capability of the receiving node.

9. The method according to claim 1, wherein the segmentation manner indicated by the data segmentation indication information comprises at least one of: an actual number of the segmented data, a size, an occupied resource, a modulation and coding scheme, and a channel used by the segmented data.

10. The method according to claim 2, wherein different second-type data uses different channel quality information and/or uses different modulation and coding schemes.

11. The method according to claim 2, wherein
in the case where the second-type data is a code block subset, the second-type data is applied to the same transmitting node; and
in the case where the second-type data is composed of a transport block and/or a transport block subset, the second-type data is applied to different transmitting nodes.

12. The method according to claim 2, wherein the transport block can undergo a CRC check process.

13. A data segmentation method, comprising:
receiving, by a transmitting node, data segmentation indication information sent by a receiving node, and segmenting, by the transmitting node, first-type data according to the data segmentation indication information and an operation parameter of the transmitting node; and
sending, by the transmitting node, second-type data resulted from the segmentation and an actual segmentation manner to the receiving node,
wherein the data segmentation indication information comprises at least one of: a number of the second-type data, a data size of the second-type data, a resource occupied by the second-type data, channel state information used by the second-type data, and a modulation and coding scheme corresponding to the second-type data; and
wherein the data segmentation indication information is determined by the receiving node based on one or more of channel state information, an interference condition, a load condition, service characteristics, and a capability of the receiving node, and when the data segmentation indication information determined by the receiving node based on one or more of channel state information, an interference condition, a load condition, and service characteristics indicates a value X, and the data segmentation indication information determined by the receiving node based on the capability of the receiving node indicates a value N, the data segmentation indication information actually used indicates min(X, N), where min(X, N) is a function for taking the minimum value of the value X and the value N, and N is a fixed configuration for a specific user.

14. The method according to claim 13, wherein the first-type data comprises a MAC layer protocol data unit PDU and/or a transport block; and the second-type data comprises at least one of a transport block, a transport block subset, and a code block sub set.

15. The method according to claim 14, wherein the subset of transport blocks comprises a plurality of transport sub-blocks obtained by segmenting the transport block.

16. The method according to claim 14, wherein the code block subset comprises a plurality of code blocks obtained by segmenting the transport block or the transport block subset.

17. A communication system, comprising a first data segmentation apparatus and a second data segmentation apparatus, wherein:
the first data segmentation apparatus comprises:
a first determining unit configured to determine data segmentation indication information corresponding to first-type data; and
a first transmitting unit configured to send the data segmentation indication information to a transmitting node to suggest a segmentation manner used by the transmitting node to segment the first-type data;
the second data segmentation apparatus comprises:
a receiving unit configured to receive data segmentation indication information sent by a receiving node, and segment the first-type data according to the data segmentation indication information and an operation parameter of a transmitting node; and
a second transmitting unit configured to send the second-type data resulted from the segmentation and an actual segmentation manner to the receiving node,
wherein the data segmentation indication information comprises at least one of: a number of the second-type data, a data size of the second-type data, a resource occupied by the second-type data, channel state information used by the second-type data, and a modulation and coding scheme corresponding to the second-type data; and
wherein the first determining unit determines the data segmentation indication information based on one or more of channel state information, an interference condition, a load condition, service characteristics, and a capability of the receiving node, and when the data segmentation indication information determined by the first determining unit based on one or more of channel state information, an interference condition, a load condition, and service characteristics indicates a value X, and the data segmentation indication information determined by the first determining unit based on the capability of the receiving node indicates a value N, the data segmentation indication information actually used indicates min(X, N), where min(X, N) is a function for taking the minimum value of the value X and the value N, and N is a fixed configuration for a specific user.

18. The communication system according to claim 17, wherein the first-type data comprises a MAC layer protocol data unit PDU and/or a transport block; and the data segmentation indication information indicates that the first-type data is segmented into one or more second-type data, wherein the second-type data comprises at least one of a transport block, a transport block subset, and a code block subset.

19. The communication system according to claim 17, wherein the first-type data comprises a MAC layer protocol data unit PDU and/or a transport block; and the second-type data comprises at least one of a transport block, a transport block subset, and a code block subset.

* * * * *